Figure 4A:
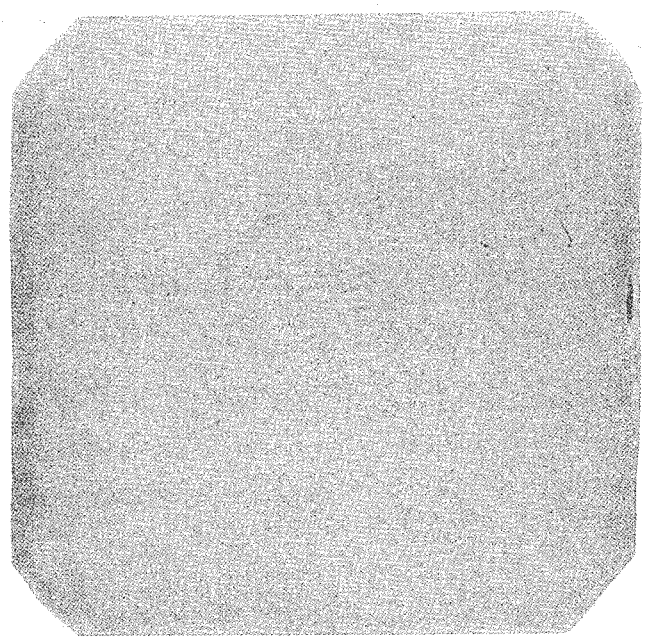

April 8, 1958 H. O. BEAVER, JR 2,829,410
INGOT MOLD
Filed June 19, 1956 9 Sheets-Sheet 1
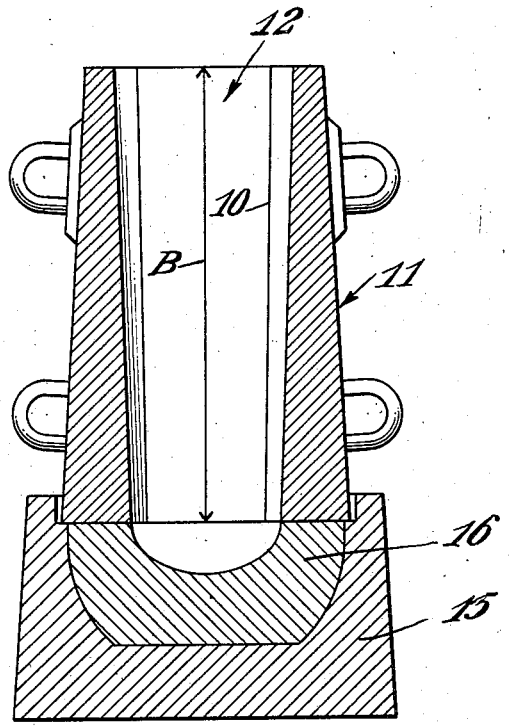
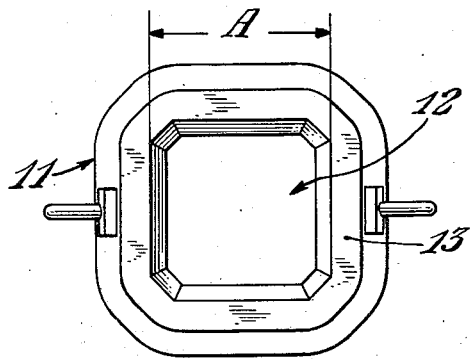
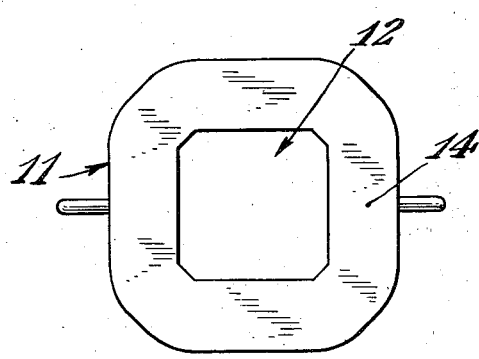

April 8, 1958 H. O. BEAVER, JR 2,829,410
INGOT MOLD

Filed June 19, 1956 9 Sheets-Sheet 7

April 8, 1958 H. O. BEAVER, JR 2,829,410
INGOT MOLD

United States Patent Office 2,829,410
Patented Apr. 8, 1958

2,829,410

INGOT MOLD

Howard O. Beaver, Jr., Reading, Pa., assignor to The Carpenter Steel Company, Reading, Pa., a corporation of New Jersey Application June 19, 1956, Serial No. 592,294

2 Claims. (Cl. 22—139)

This invention relates to an ingot mold and more particularly to a mold for forming ingots of steel or the like from molten metal.

It has long been known that the manner in which the molten metal solidifies and cools in a mold determines, to a large extent, the amount of discard from a given ingot as well as certain important properties of the products made therefrom such as segregation and center defects. To a large extent such defects result from temperature differentials in the ingot during the cooling cycle and indicate an undesired solidification pattern in the ingot. Considerable effort has been expended in overcoming these shortcomings resulting in the provision of big-end-up molds as well as the practice of maintaining a reservoir of liquid metal at the top to compensate for contraction in the ingot body. One fairly common expedient involves the use of molds, the wall thickness of which tapers downwardly, with increasing thickness toward the bottom, for the purpose of enhancing the cooling rate at the bottom while reducing the cooling rate at the top of the poured metal. The theory behind this is that the reduced cross-sectional thickness of the mold at the top in effect retard cooling there. Actually the teemed metal rapidly contracts and draws away from the mold wall thereby permitting a barrier of air to appear between the metal and mold wall interface which functions to retard heat exchange across the interface. Consequently, the effectiveness of tapered wall thickness was much less than had been hoped for.

The normal tendency of a body of molten metal to cool from the outside in, has thus far not been overcome by molds hitherto in use to the extent necessary to avoid such defects as segregation, blow holes and lack of homogeneity. It may be well to point out that if the cooling rate from bottom to top along the axis of the mold is not sufficiently rapid as compared to the cooling rate from the sides inwardly toward the axis or from the top down, a solid wall of metal may form transversely bridging the ingot. Below the bridge, metal still in its liquid state becomes trapped and as the surrounding metal contracts, a cavity may result due to differentials in contraction between the solid and liquid metal. At best, the resulting ingot will comprise an intolerable proportion of discard due to segregation and other defects.

From experiments which I have conducted, I have found that it is possible, by adhering to certain critical relative mold dimensions, to approach closely freedom from macro- and micro-segregation of constituents and chemical compounds and elements, which is the ideal ingot condition. Furthermore, I attain these outstanding results without resorting to a sharply tapered mold cavity which results in an undesirable ingot shape from the standpoint of subsequent working of the metal.

It is, therefore, a principal object of this invention to provide improved ingot molds, the dimensions of which insure the attainment of that solidification pattern in the ingot which minimizes bridging, segregation and other center defects, and provides ingots of greatly enhanced homogeneity.

In accordance with my present invention, the molds are of such dimensions that relatively short and thick ingots result which are stumpy in appearance. An essential relationship in the dimensions of my molds involves the ratio of the height or axial length of the mold cavity to the width of the top-end of the cavity. Thus the ratio of the height of the cavity to the width or twice the radius of the top-end of the cavity should not exceed 2.6 nor be less than 2. Within these limits I have found the lower portion of the range gives the best results for the small top-end cavity radii while for larger radii the upper portion of the range is best. The area of the mold wall and the area of the cavity at both the top and bottom of the mold must also conform to a definite relationship. The ratio of the top-end area of the mold wall to the cavity area at the top end should range from .50 to .70, while at the bottom the value of the corresponding ratio should be between 2.40 and 2.70. To facilitate subsequent working of the ingot, the mold-cavity taper from top to bottom should be minimized. This determines the ingot taper which is obtained by determining the decrease in cross-section dimension per foot of running length from top to bottom. With the foregoing relative mold dimensions mold-cavity taper should be between .6 inch per foot to 1.0 inch per foot.

Further objects as well as advantages of this invention will be apparent from the following description and the accompanying drawing in which:

Figure 1 is a vertical cross-sectional view of a mold constructed in accordance with this invention together with its stool and stool insert;

Figures 2 and 3, respectively, are top and bottom plan views thereof with the stool and stool insert removed;

Figures 4A–F are views made from photographs of hot worked specimens prepared from ingots cast into molds constructed in accordance with the present invention;

Figures 5A–F are views, similar thereto, of specimens prepared from ingots cast into conventional molds but otherwise subjected to the same treatment as the specimens shown in Figures 4A–F; and Figures 6–11 are views made from photographs of hot worked specimens prepared from ingots cast into molds of various dimensions.

Referring to the drawings, the inner wall 10 defines the cavity 12 of mold 11, the longitudinal axis of which being indicated by line B. As shown in Figures 2 and 3, the top and bottom end sections of the cavity are substantially square with the corners shortened to eliminate undesired temperature gradients in the ingot at the corners during cooling. Top-end width is indicated by line A. As previously indicated tapered big-end-up molds have heretofore been provided but the ingots from such molds leave much to be desired with respect to their homogeneity, freedom from segregation, porosity or other defects. An essential difference between mold 11 and molds hitherto in use resides in the fact that the top-end cross section width or diameter, that is, dimension A, is substantially larger as compared to the axial length, dimension B, than heretofore. I have found that the value of the ratio B/A to a large extent determines whether the cooling conditions at the bottom of the mold can provide the desired effect before solidification actually starts to occur to any great extent from the outsides in or from the top down to the ingot. From my experiments I discovered that there is a critical range of values for the ratio B/A which are substantially free of all normal ingot defects. The value of the ratio of the height of the mold cavity to its top end width (or diameter) should not be less than 2 nor greater than 2.6. Furthermore, the smaller the length of dimension A the closer the value of the ratio B/A should be to 2. For larger values of dimension A a greater ratio closer to 2.6 may be used. For example, mold 11 actually illustrates a mold having a top-end cavity width, dimension A, of 13 inches. Here the height of the cavity or dimension B is preferably selected such that the value of B/A is close to 2.3. On the other hand, when dimension A is 20 inches, B/A equal to about 2.5 gives good results.

I have also determined that there should be a definite relationship between the mold wall cross-sectional area and the cavity area both at the top and at the bottom of the mold. Thus, in addition to the top-end section of the mold cavity having a predetermined minimum relation to the axial length of the mold, the ratio of the mold end wall area to the end area of the mold cavity both at the top and the bottom of the mold must fall within a critical range of values in order to obtain best results. In Figure 2, the top end wall of mold 11 is indicated at 13 and the ratio of the area of the end wall 13 to the area of the top-end section of the mold cavity (Figure 2) should range from .50 to .70. In Figure 3, the bottom-end wall of mold 11 is indicated at 14 and the ratio of the area of the bottom-end wall 14 to the area of the bottom-end section of the mold cavity (Figure 3) should range from 2.40 to 2.70.

The greater the ingot taper, longitudinally, the more progressive solidification from bottom to top is favored. However, end to end taper in the ingot is limited by the fact that taper adversely affects subsequent processing such as blooming or cogging and excessive taper may render such processing so difficult as to make the ingot virtually useless for commercial purposes. I have found that the foregoing critical mold dimension relationships make possible substantial minimization of cavity taper represented by the decrease in cross-sectional width or diameter per foot of running length from the top to the bottom of the ingot. Taper as low as from .6 inch per foot to 1 inch per foot is successfully used in my molds with consistently good results.

Bottom-end cooling of the ingot is affected by the type of stool or stool insert upon which the mold is set. As shown in Figure 1, mold 11 is set upon a stool 15 having a massive insert 16 capable of extracting the required amount of heat from the bottom of the ingot. Stool 15 and stool insert 16 are of conventional structure except that insert 16 has a minimum wall thickness of 6 inches. The insert is made of suitable high conductivity metal such as copper and additional cooling may be provided by passing a suitable cooling medium such as water, steam, or air through or around insert 16.

Ingots produced in molds constructed in accordance with this invention are uniformly better than ingots obtained from molds heretofore in use. In fact, the present molds produce ingots which are free from segregation and center defects to such an extent that not only is the amount of discard sharply reduced but the quality of the ingots and products produced therefrom is greatly improved.

Test sections cut from ingots produced in my molds after etching indicate that the ingots are characterized by a freedom from defects and have such homogeneity as was unattainable from prior molds.

Figure 4B:
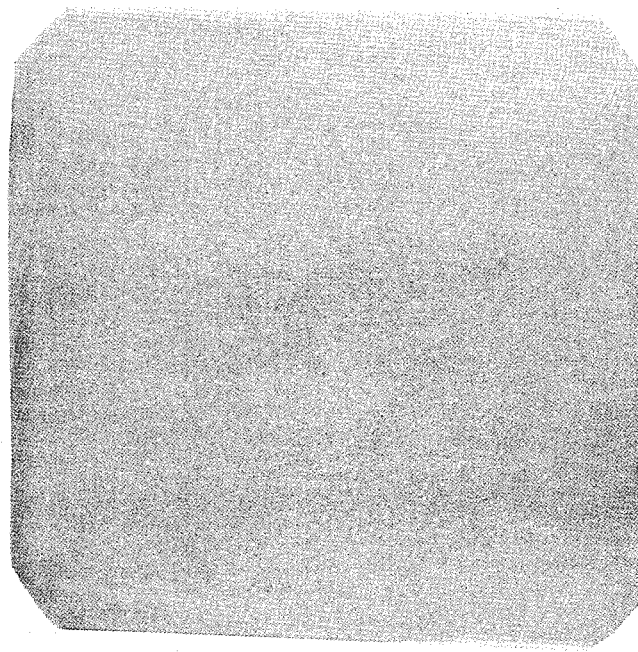
Figure 4C:
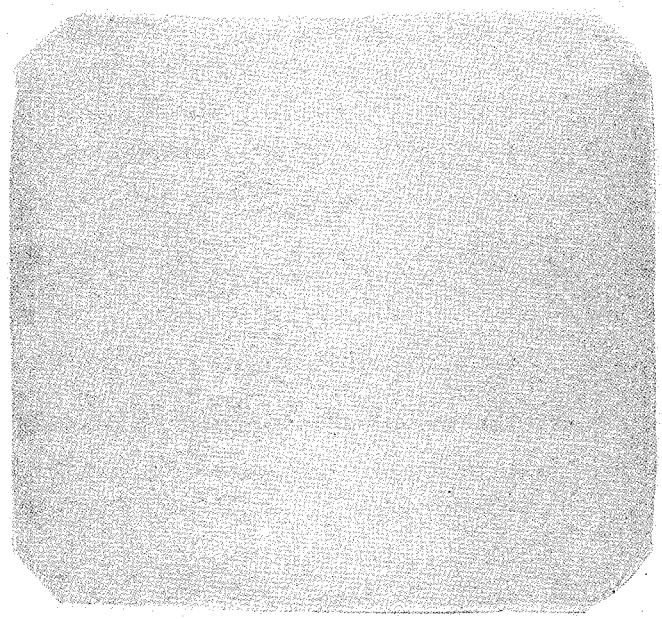
Figure 5A:
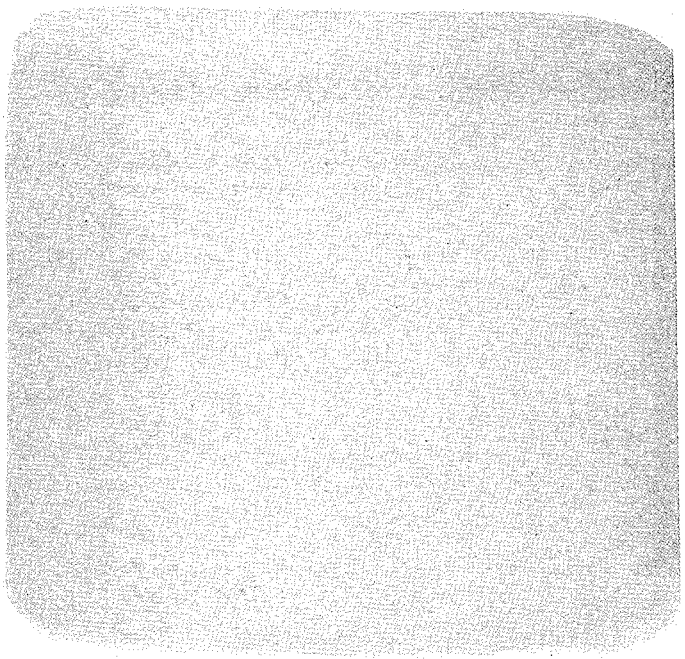
Figure 4D:
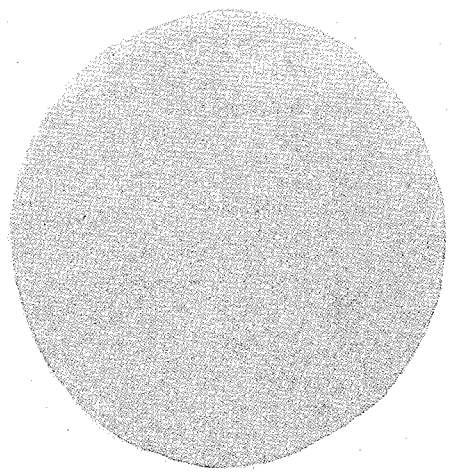
Figure 4E:
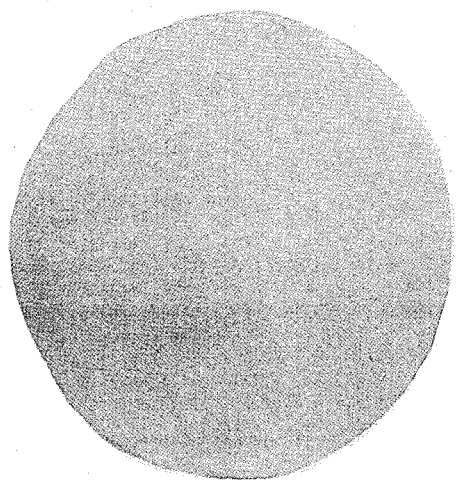
Figure 4F:
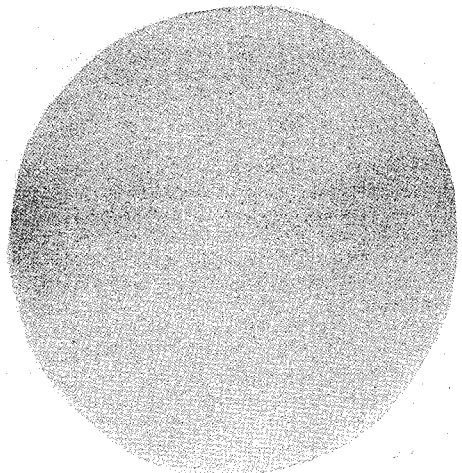
Figure 5B:
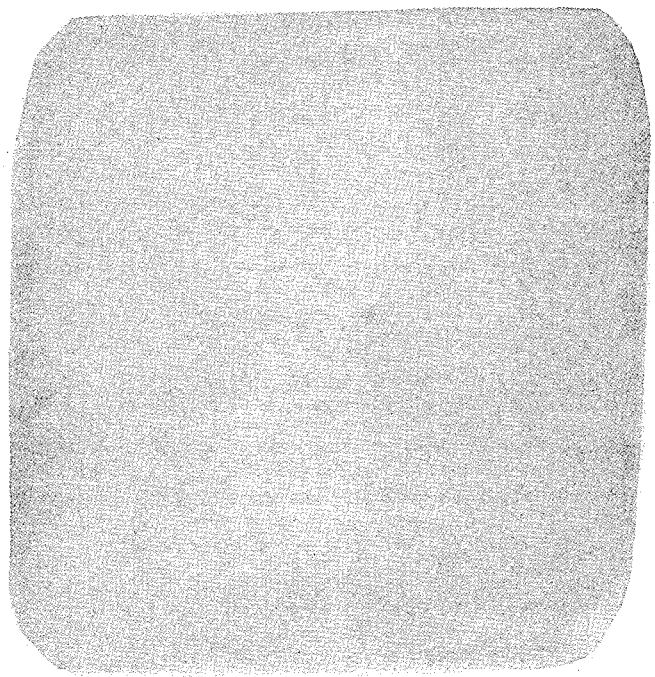
Figure 5C:
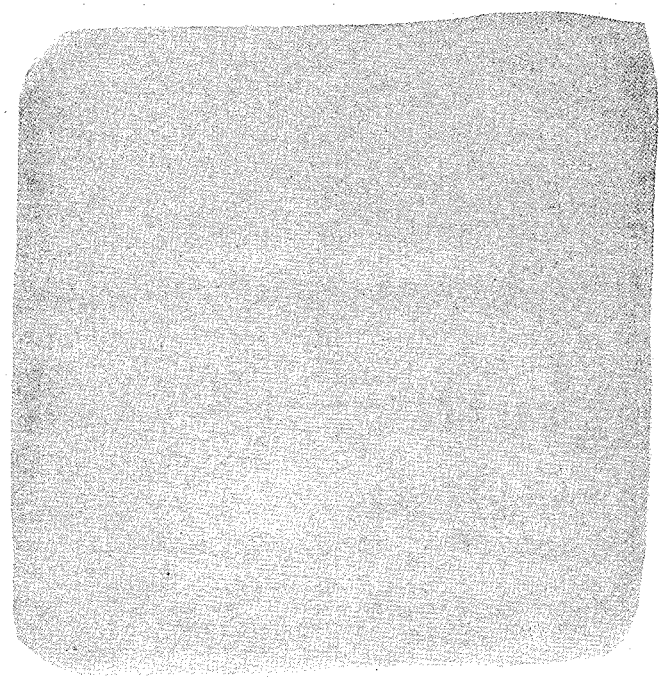

Figures 4A–F and 5A–F provide a direct comparison of the product obtained from molds constructed in accordance with this invention with that from molds hitherto in use. Figures 4A–C were prepared from photographs taken of discs cut from a billet which was in turn prepared from an ingot cast into a mold constructed in accordance with the present invention. The mold had a dimension A equal to 13 inches and the ratio B/A was equal to 2.5. The ingot was cogged to a five-inch square billet before the discs were cut. The discs shown in Figures 4A, 4B and 4C were cut respectively from top, middle and bottom of the billet. Before being photographed, the discs were mildly etched. Figures 5A–5C were prepared from photographs taken of discs cut respectively from the top, middle and bottom of a billet which corresponded in every detail to that used in the preparation of the discs shown in Figures 4A–C except that a conventional mold having a B/A ratio of 4.5 was used in casting the ingot. It should also be noted that the ingots were prepared from melts having the same general composition as follows: carbon 2.10%, manganese .25%, silicon .25%, chromium 12.50%, nickel .50%, and the remainder substantially iron. The improvement in the macro-structure in Figures 4A–C as compared to Figures 5A–C is readily apparent particularly in connection with the middle and top specimens.

Figure 5D:
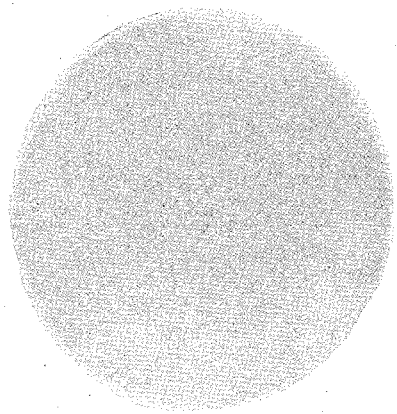
Figure 5E:
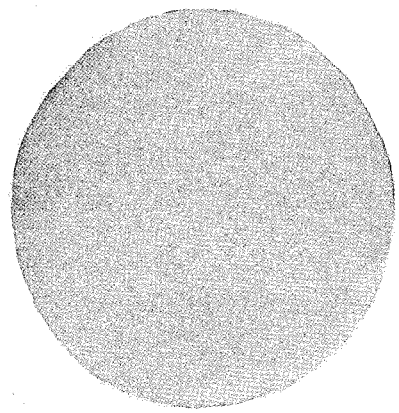
Figure 5F:
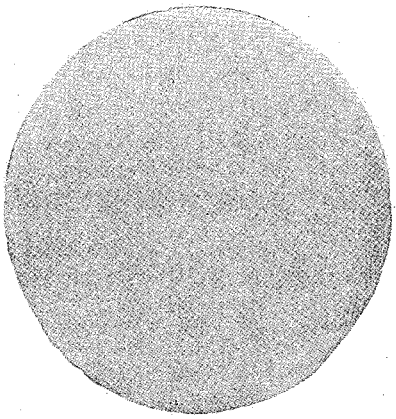
Figure 6:
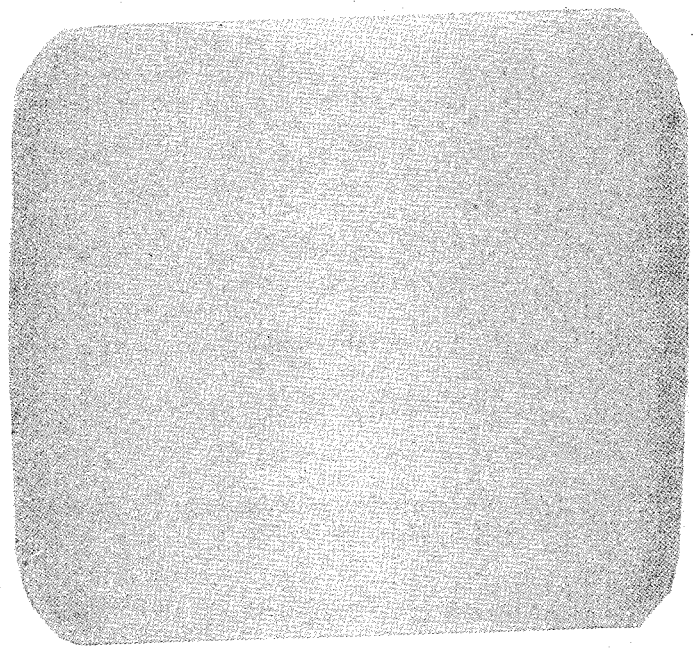
Figure 7:
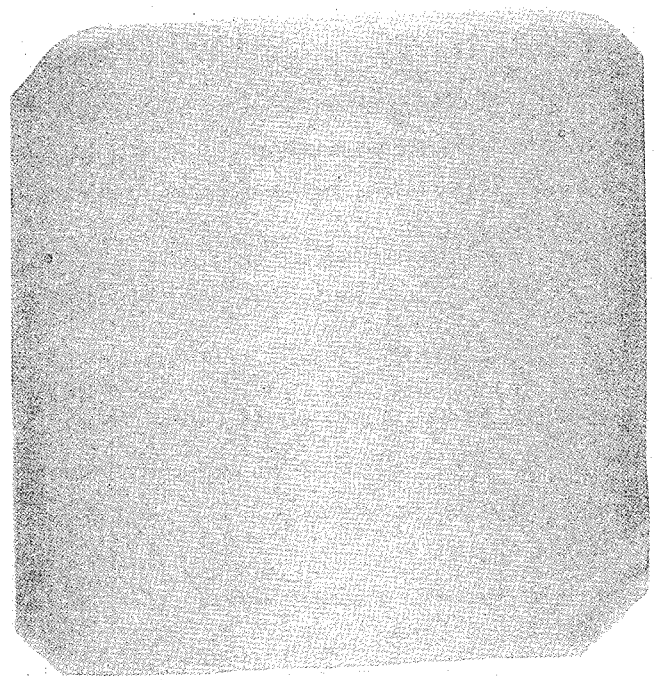

The discs shown in Figures 4D–F were cut respectively from the top, middle and bottom of a billet and correspond respectively to those shown in Figures 4A–C but in this instance a five-inch square billet was additionally rolled to a three and one-half inch round billet. The ingot from which the discs of Figures 4D–F were prepared was cast into a mold substantially identical with that used in connection with the ingot from which the discs of Figures 4A–C were prepared. Figures 5D–F are similar views of discs cut respectively from the top, middle and bottom of a three and one-half inch round billet prepared in the same way from an ingot cast into a conventional mold as was described in connection with Figures 5A–C. The effect of a mold constructed in accordance with this invention as compared to that of a conventional mold on the products from an ingot is readily apparent from a comparison of Figures 4D–F with Figures 5D–F, respectively. Figure 5E clearly shows defects in the macro-structure of the disc from the middle section of the billet while Figure 4E shows the characteristic high degree of uniformity, essentially free of defects, obtainable when molds constructed in accordance with this invention are used. The marked difference in quality is also apparent from the discs shown in Figures 4D and 5D.

The importance and critical nature of the mold dimensions of my invention will be most clearly apparent from Figures 6 through 11. Two different alloy compositions were used and ingots of each composition were cast into three molds having different dimensions. The specimens shown in Figures 6 and 9 were prepared from an ingot cast into a mold having $B/A=2$. The specimens shown in Figures 7 and 10 were prepared from an ingot cast into a mold having $B/A=2.5$. The specimens shown in Figures 8 and 11 were prepared from an ingot cast into a mold having $B/A=3$. The composition of the discs of Figures 6–8 was essentially carbon 1.30%, manganese .20%, silicon .20% and the remainder iron. The composition of the discs of Figures 9–11 was essentially carbon .90%, manganese .40%, silicon .40%, and the remainder iron. Each of these six discs were cut from equivalent top billet sections. The preparation of the billets differed in no significant way, each having been prepared from an ingot which was forged to a five inch square. The substantially 75% minimum reduction was provided by hammer cogging. While casting the ingots, precautions were taken, including seating each of the molds on a copper stool, to avoid a lack of uniformity in the conditions which might affect the ingots other than the intended differences in mold dimensions.

Figure 8:
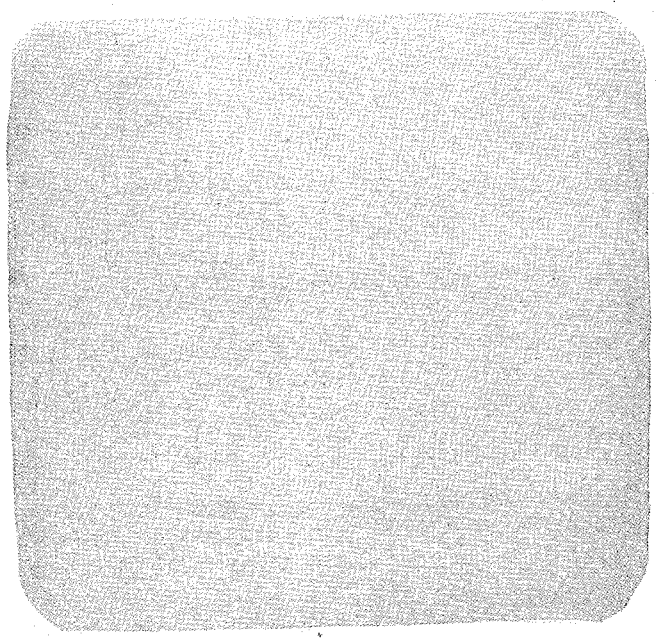
Figure 9:
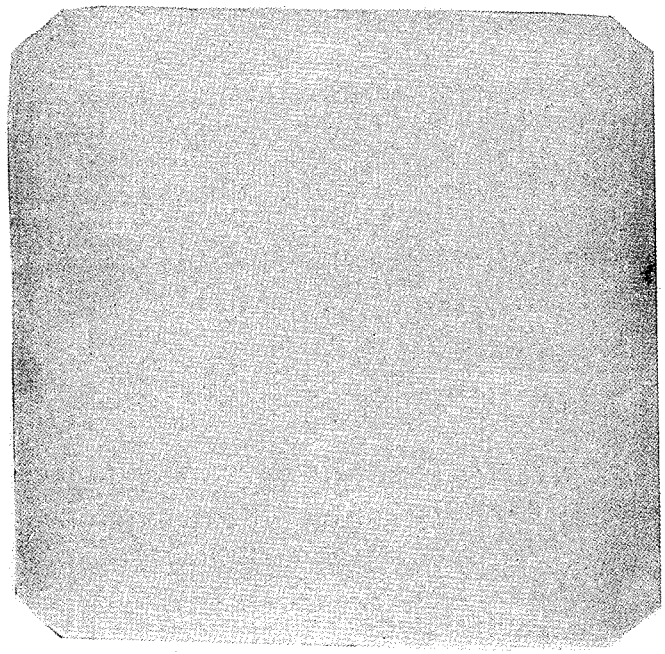
Figure 10:
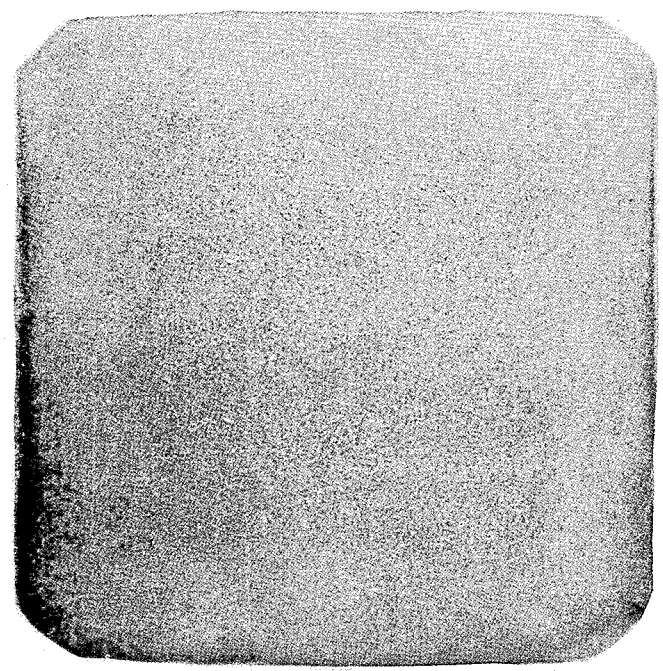
Figure 11:
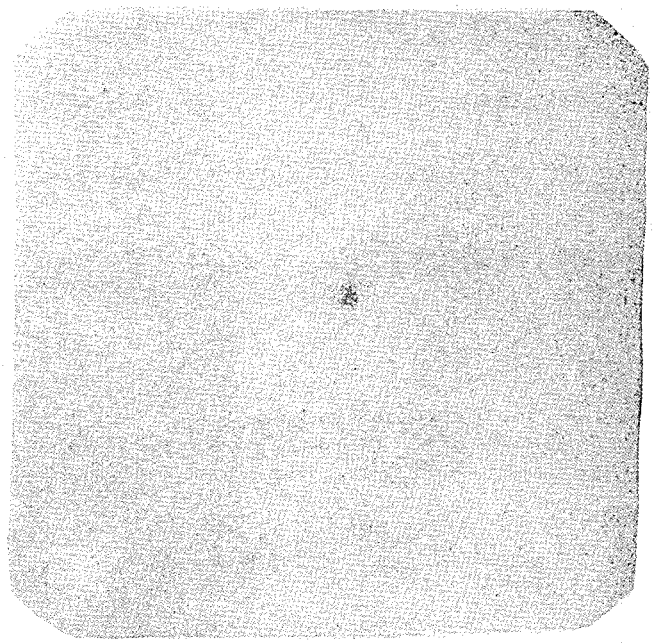

The sharp contrast between the results illustrated in Figures 6, 7, 9 and 10 as compared to the results shown in Figures 8 and 11 clearly demonstrates that ingot molds for which the value of the ratio B/A is above about 2.6 produce ingots having substantial macro-structure center defects.

Products produced from ingots cast into molds of this invention have substantially enhanced properties and in particular are characterized by a substantially longer useful life. This is clearly demonstrated by the results of a test in which two cold heading die sets having substantially the same composition and treatment were run using the same wire to be cold headed and under the same conditions. The cold heading die formed from metal of an ingot cast into my mold provided 75,000 pieces as its output and wore oversize with no evidence of spalling, chipping or cracking in the impression. The other die, which had been formed of metal cast into a conventional mold, produced only 6,000 pieces before failing due to cracking in the impression.

The terms and expressions which I have employed are used as terms of description and not of limitation, and I have no intention, in the use of such terms and expressions, of excluding any equivalent of the features shown and described or portions thereof, but recognize that various modifications are possible within the scope of the invention claimed.

I claim:

1. An ingot mold for forming ingots characterized by enhanced freedom from segregation and center defects, having an upper and lower end and a cavity formed therein extending from top to bottom thereof the axial length of which being from 2.6 to 2 times the width of its upper end, the cross-sectional thickness of the mold wall being such that the ratio of the area of the top-end wall to the area of the top end of the cavity is from .50 to .70, and the ratio of the area of the bottom-end wall to the area of the bottom end of the cavity is from 2.40 to 2.70.

2. A big-end-up ingot mold for forming ingots characterized by enhanced freedom from segregation and center defects, having an upper and lower end and a cavity formed therein extending from top to bottom thereof the axial length of which being from 2.6 to 2 times the width of its upper end, the cross-sectional thickness of the mold wall being such that the ratio of the area of the top-end wall to the area of the top-end of the cavity is from .50 to .70, the inner wall surface of the mold defining the cavity tapering radially inward such that the decrease in the diameter of the cross section of the cavity from top to bottom per foot of running length along the axis of the mold is from .6 inch of cross-section diameter per foot of axial length to 1.0 inch per foot, and the ratio of the area of the bottom end wall to the area of the bottom end of the cavity is from 2.40 to 2.70.

References Cited in the file of this patent

UNITED STATES PATENTS

| | | |
|---|---|---|
| 1,170,629 | Gathmann | Feb. 8, 1916 |
| 1,440,535 | Gathmann | Jan. 2, 1923 |
| 1,643,241 | Gathmann | Sept. 20, 1927 |
| 1,819,705 | Gathmann | Aug. 18, 1931 |
| 2,093,024 | Williams | Sept. 14, 1937 |
| 2,310,553 | Schofield | Feb. 9, 1943 |
| 2,339,601 | Gathmann | Jan. 18, 1944 |
| 2,654,144 | Dornin | Oct. 6, 1953 |